US010770743B2

(12) United States Patent
Teranishi et al.

(10) Patent No.: US 10,770,743 B2
(45) Date of Patent: Sep. 8, 2020

(54) ELECTRODE MANUFACTURING METHOD, ELECTRODE, AND SECONDARY BATTERY

(71) Applicant: SEKISUI CHEMICAL CO., LTD., Osaka (JP)

(72) Inventors: Rie Teranishi, Tsukuba (JP); Kenichi Shinmei, Columbia, MO (US); Masashi Kanoh, Tsukuba (JP); Akio Shokaku, Tsukuba (JP); Shinichiro Ito, Tsukuba (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/539,368

(22) PCT Filed: Dec. 25, 2015

(86) PCT No.: PCT/JP2015/086403
§ 371 (c)(1),
(2) Date: Jun. 23, 2017

(87) PCT Pub. No.: WO2016/104782
PCT Pub. Date: Jun. 30, 2016

(65) Prior Publication Data
US 2017/0373338 A1 Dec. 28, 2017

(30) Foreign Application Priority Data
Dec. 26, 2014 (JP) ................................. 2014-266525

(51) Int. Cl.
*H01M 10/04* (2006.01)
*H01M 2/16* (2006.01)
*H01M 4/139* (2010.01)
*H01M 2/02* (2006.01)

(52) U.S. Cl.
CPC .......... *H01M 10/04* (2013.01); *H01M 2/028* (2013.01); *H01M 2/16* (2013.01); *H01M 4/139* (2013.01)

(58) Field of Classification Search
None
See application file for complete search history.

(56) References Cited

U.S. PATENT DOCUMENTS

| 2004/0091776 A1 | 5/2004 | Hwang et al. | |
| 2006/0269842 A1* | 11/2006 | Ichinose | H01M 2/0207 429/247 |
| 2008/0233477 A1* | 9/2008 | Takahashi | H01M 4/131 429/212 |
| 2011/0206962 A1 | 8/2011 | Minami et al. | |
| 2013/0115510 A1 | 5/2013 | Tani et al. | |

FOREIGN PATENT DOCUMENTS

| EP | 2765629 A1 | | 8/2014 | |
| JP | 2001-035532 A | | 2/2001 | |
| JP | 2002-117825 A | | 4/2002 | |
| JP | 2004-533702 A | | 11/2004 | |
| JP | 2006-179205 A | | 7/2006 | |
| JP | 2006179205 A | * | 7/2006 | ............ H01M 10/40 |
| JP | 2006-338918 A | | 12/2006 | |
| JP | 2006-351386 A | | 12/2006 | |
| JP | 2011-171250 A | | 9/2011 | |
| JP | 2012-174414 A | | 9/2012 | |
| WO | 02/075826 A2 | | 9/2002 | |

OTHER PUBLICATIONS

International Search Report issued with respect to Patent Application No. PCT/JP2015/086403, dated Mar. 8, 2016.
Ripolles-Sanchis Teresa et al: "Electrodeposited NiO anode interlayers: Enhancement of the charge carrier selectivity in organic solar cells", Solar Energy Materials and Solar Cells, vol. 117, Jul. 20, 2013, pp. 564-568.
Ki-Hun Ok et al: "Ultra-thin and smooth transparent electrode for flexible and leakage-free organic light-emitting lodes", Scientific Reports, vol. 5, No. 1, Mar. 31, 2015.
European Search Report issued in European Application No. 15873350. 1, dated May 17, 2018.

* cited by examiner

*Primary Examiner* — Karie O'Neill Apicella
(74) *Attorney, Agent, or Firm* — Greenblum & Bernstein, P.L.C.

(57) ABSTRACT

A method for manufacturing an electrode having a laminated body including an insulating layer laminated on an electrode active material layer, said method comprising: a step of laminating an insulating layer on an electrode active material layer formed on a base, such that a thickness value of the insulating layer is at least twice a surface roughness Rz value of the electrode active material layer, the surface roughness Rz value being a ten point average roughness as measured in accordance with JIS B0601 1994.

28 Claims, No Drawings

ELECTRODE MANUFACTURING METHOD, ELECTRODE, AND SECONDARY BATTERY

TECHNICAL FIELD

The present invention relates to a method for manufacturing an electrode having an insulating layer laminated on an electrode active material layer, an electrode and a secondary battery using the same.

Priority is claimed on Japanese Patent Application No. 2014-266525, filed Dec. 26, 2014, the contents of which are incorporated herein by reference.

BACKGROUND ART

With respect to electrochemical devices such as secondary batteries and electric double layer capacitors, vigorous efforts have been made for achieving various improvements such as reduction in size and weight, increase in capacity and extension of life. In order to keep a positive electrode and a negative electrode of these electrochemical devices to be separated from each other so as to prevent electrical short circuit, a separator made of an insulating material has been used conventionally.

Patent Document 1 discloses an electrochemical cell having an inactive layer serving as a porous separator on an electrode active material. Patent Document 2 discloses a technique concerning a separator which is a porous film formed of a resin material composed mainly of a synthetic resin and filler particles, and having communicating pores.

CITATION LIST

Patent Literature

Patent Document 1: Japanese Unexamined Patent Application Publication (Translation of PCT Application) No. 2004-533702
Patent Document 2: Japanese Unexamined Patent Application Publication No. 2006-338918

DISCLOSURE OF INVENTION

Problems to be Solved by the Invention

Incidentally, when an electrode having a laminated body composed of an electrode active material layer and an insulating layer was pressurized to reduce the thickness of the insulating layer influencing the internal resistance of a battery for the purpose of improving the battery performance, a secondary battery having such an electrode encountered a problem of deterioration of the cycle performance.

The present inventors have investigated the cause of the above problem, and speculated the cause to be as follows. When an electrode active material layer on which an insulating layer is laminated has a rough surface, the pressurization excessively reduces the thickness of the insulating layer locally at portions thereof which are laminated on protruding parts of the surface of the electrode active material layer.

The present invention has been made in view of the above situation, and the object of the present invention is to provide a method for manufacturing an electrode having a laminated body including an insulating layer having a uniform thickness laminated on the electrode active material layer, and to provide the electrode.

Means to Solve the Problems

1. A method for manufacturing an electrode having a laminated body including an insulating layer laminated on an electrode active material layer, said method comprising:
a step of laminating an insulating layer on an electrode active material layer formed on a base, such that a thickness value of the insulating layer is at least twice a surface roughness Rz value of the electrode active material layer,
the surface roughness Rz value being a ten point average roughness as measured in accordance with JIS B0601 1994.
2. The method according to item 1 above, where the step of laminating an insulating layer on an electrode active material layer formed on a base is a step includes laminating the insulating layer by coating a composition including an insulating material on the electrode active material layer, such that a thickness value of the insulating layer is at least twice a surface roughness Rz value of the electrode active material layer.
3. The method according to item 1 above, wherein the surface roughness Rz value is 35 μm or less.
4. The method according to item 2 or 3 above, wherein the composition is coated such that the thickness value of the insulating layer falls within a range of 2 μm to 35 μm.
5. The method according to any one of items 2 to 4 above, wherein the composition is coated by blade coating method.
6. An electrode having a laminated body including an insulating layer laminated on an electrode active material layer,
wherein a ratio (t/Rz) of a thickness value of the insulating layer to a surface roughness Rz value of the electrode active material layer is at least 2,
the surface roughness Rz value being a ten point average roughness as measured in accordance with JIS B0601 1994.
7. The electrode according to item 6 above, wherein the surface roughness Rz value is 35 μm or less.
8. The electrode according to item 6 or 7 above, wherein the thickness value of the insulating layer is in a range of 2 μm to 35
9. A method for manufacturing a secondary battery having a positive electrode, a negative electrode, and an insulating layer laminated between the positive electrode and the negative electrode, said method including:
a step of laminating an insulating layer on an electrode active material layer of one of the positive electrode and the negative electrode,
the insulating layer having a thickness value of at least twice a surface roughness Rz value of the electrode active material layer,
the surface roughness Rz value being a ten point average roughness as measured in accordance with JIS B0601 1994.
10. The method according to item 9 above, wherein the surface roughness Rz value of the electrode active material layer is 35 μm or less.
11. The method according to item 9 or 10 above, wherein the thickness value of the insulating layer is in a range of 2 μm to 35
12. A secondary battery having a positive electrode, a negative electrode, and an electrolyte layer disposed between the positive electrode and the negative electrode, at least one of the positive electrode and the negative electrode having a laminate structure wherein the electrode has an insulating layer laminated on an electrode active material layer provided on a surface of the electrode opposite to the other electrode, wherein the electrode having the insulating layer has a thickness t value of the insulating layer and a surface roughness Rz value such that a ratio (t/Rz) of the thickness t value to the surface roughness Rz value is at least 2.

13. The secondary battery according to item 12 above, wherein the surface roughness Rz value of the electrode active material layer is 35 μm or less.

14. The secondary battery according to item 12 or 13 above, wherein the thickness value of the insulating layer is in a range of 2 μm to 35 μm.

15. The secondary battery according to item 12 above, wherein the surface roughness Rz value of the electrode active material layer is 17.5 μm or less, and the thickness value of the insulating layer is in a range of 2 μm to 35 μm.

16. The secondary battery according to any one of items 12 to 15 above, which has a porous resin separator provided between the positive electrode and the negative electrode.

Effect of the Invention

According to the method of the present invention, it is possible to manufacture an electrode which suffers less occurrence of local concentration of stress caused by expansion and shrinkage of the electrode accompanying the temperature change during the use or the repeated charge and discharge, and has an improved reliability in structural strength that is available even when the insulating layer is thin.

In the case where the electrode of the present invention is used as an electrode of a secondary battery such as a lithium ion secondary battery, the durability and safety of the secondary battery can be improved even when a lithium dendrite is generated between the positive electrode and the negative electrode. This is because the structural strength of the insulating layer on the electrode surface is uniform in the plane direction so that the insulating layer is free of localized spots that are likely to be penetrated by the lithium dendrite (e.g., a spot where the stress concentrates).

DESCRIPTION OF THE EMBODIMENTS

<<Method for Manufacturing an Electrode>>

The method of the present invention in the first aspect thereof is a method for manufacturing an electrode having a laminated body including an insulating layer laminated on an electrode active material layer. The insulating layer is functionable as a separator for insulating a positive electrode against a negative electrode in an electrochemical device such as a secondary battery, and a capacitor.

Further, the electrode manufacturing method of the present invention in the first embodiment includes at least a step of laminating the insulating layer on the electrode active material layer formed on a base. In this step, the insulating layer is laminated such that a thickness value of the insulating layer is at least twice a surface roughness Rz value (unit: μm) of the electrode active material layer.

The step of laminating the insulating layer on the electrode active material layer can be carried out, for example, by coating a composition containing an insulating material on the electrode active material layer. Further, in this step, the composition is coated in a manner such that a thickness value of the insulating layer is at least twice a surface roughness Rz value of the electrode active material layer.

The thickness value of the insulating layer is a thickness value (unit: μm) of the insulating layer obtained after volatilization of a solvent contained in the coated composition by drying. The thickness value of the insulating layer after drying can be determined as follows. The cross section in the thickness direction of the electrode is observed with an electron microscope, and then, the thickness of the electrode is measured at a plurality of points (for example, 10 points). The thickness value of the insulating layer can be obtained as an arithmetic mean of the measured thickness values. The specific method for determining the thickness value of the insulating layer will be described in detail as the method for determining a thickness value (t) of an insulating layer of an electrode in the second embodiment of the present invention.

Further, in the step of laminating the insulating layer on the electrode active material layer, the composition is preferably coated to form a coating having a thickness value that is at least twice a surface roughness Rz value (unit: μm) of the electrode active material layer.

Coating the composition with such a thickness value means that the ratio (t/Rz) of the thickness value t (unit: μm) of the coated composition before drying to the surface roughness Rz value (unit: μm) of the electrode active material layer is more than 2.

The surface roughness Rz value is a ten point average roughness as measured in accordance with JIS B0601 1994.

By coating the composition with the above thickness value, it becomes possible to reduce the influence of the surface roughness Rz which particularly reflects convex spots on the surface of the electrode active material layer. As a result, even after the pressurization of the laminated body including the insulating layer, the occurrence of spots where the insulating layer is extremely thin can be prevented and, hence, the deterioration in the insulation property and the cycle performance can be suppressed. These effects are enhanced when the insulating layer formed is thin, that is, when the thickness value of the coated composition is small, for example, about 35 μm or less. Particularly remarkable effects are available when the thickness value of the coated composition is about 20 μm or less.

The surface roughness Rz value of the surface of the electrode active material layer to be coated with the composition, that is, the surface to the coated, is preferably 35 μm or less, more preferably 17 μm or less, and still more preferably 6 μm or less.

When the surface roughness Rz value of the surface to be coated is 35 μm or less, the insulating layer can be obtained with sufficiently uniform thickness and density in the planar direction while reducing the influence of the surface roughness Rz value of the coated surface, even when the insulating layer formed is thin, that is, the thickness of the composition coated is small. Furthermore, it is also possible to reduce the surface roughness of the insulating layer to be formed.

The thickness of the composition when coating the composition is preferably set in consideration of the thickness of the insulating layer to be formed. For example, with respect to the thickness value of the insulating layer to be formed, the thickness value is preferably 2.0 to 30 times the surface roughness Rz value of the surface of the electrode active material layer to be coated with the composition, i.e., surface to be coated, more preferably 2.5 to 25 times, still more preferably 3.0 to 20 times, and particularly preferably 4.0 to 15 times.

By coating the composition such that the thickness value of the formed insulating layer is at least 2.0 times the surface roughness Rz value of the electrode active material layer, it becomes possible to improve the uniformity in the thickness of the insulating layer in the planar direction. By coating the composition such that the thickness value of the formed the insulating layer is not more than 30 times the surface roughness Rz value of the electrode active material layer, it becomes possible to prevent the electric resistance attributable to the insulating layer from becoming too high.

The specific thickness value of the composition when coating the composition is not particularly limited as long as the resultant coating is satisfactory in both insulation and mechanical strength. For example, it is desirable to coat the composition such that the thickness value of the formed insulating layer is preferably 2 μm to 35 more preferably 4 μm to 30 still more preferably 8 μm to 25 and most preferably 10 μm to 20 with the proviso that the aforementioned ratio (t/Rz) is satisfied.

By coating the composition such that the thickness value of the formed insulating layer is 2 μm or more, it becomes possible to form an insulating layer having a sufficient insulation property while ensuring the production rate required for commercial scale practice. By coating the composition such that the thickness value of the formed insulating layer is 35 μm or less, it becomes possible to reduce the electrical resistance attributable to the insulating layer, that is, internal resistance of the battery.

By coating the composition, an insulating layer having substantially the same thickness t as the thickness of the coated composition is obtained as long as the composition used has a viscosity that allows the composition to be coated with a desired thickness, which, however, may be influenced by the ratio of solid components in the composition. If the thickness of the coated composition decreases after drying, it is preferable to coat the composition with a thickness obtained by adding the decrease in thickness to the thickness after drying. In such a case, for example, the composition may be coated such that the coated composition has a thickness of about 1.0 to 2.0 times the thickness t of the insulating layer to be formed.

When the viscosity of the composition is high or the thickness of the coated composition is large, the degree of drying is caused to vary between the surface and the interior of the coated composition. This may result in a difference in pore formation between the surface and the interior of the coated composition. As an example of means for solving this problem, the coating formation may be gradually performed by repeating a set of coating and drying of the composition more than once until a desired thickness is achieved for the purpose of uniformly forming the pores.

On the other hand, the non-uniform pore formation as mentioned above may be intentionally caused in the insulating layer by performing the coating only once. Alternatively, the multistage lamination of the compositions differing in the solid content, viscosity and/or composition may form an insulating layer that varies in pore formation as viewed in the thickness direction.

The method for coating the composition on the surface of the electrode active material layer is not particularly limited, and the coating can be performed by, for example, dip coating, spray coating, roll coating, doctor blade coating, gravure coating, screen printing, or the like. The coating may be performed by a method of casting the composition on the surface to be coated. The preferred method among these coating methods is blade coating, such as doctor blade coating, in which the composition is applied with a "spatula".

Examples of the blade coating include a method in which the composition is applied with a spatula to a curved surface of an object fixed on a roll, and a method in which the composition is applied with a spatula to a flat surface of an object fixed on a flat plate.

<Composition Including Insulating Material>

The composition to be coated on the electrode active material layer includes at least an insulating material. The composition preferably includes insulating fine particles and a resin material (binder) as the insulating material.

The compositions may, if desired, contain a solvent to dissolve or disperse the insulating material. When the composition contains the solvent in an appropriate amount, it becomes possible to adjust the density ρ, kinematic viscosity ν, surface tension σ and the like of the composition to desired levels.

For forming a uniform and thin coating of the composition, the composition is preferably in the form of a slurry (paste) having a suitable viscosity.

The type of insulating material constituting the insulating layer is not particularly limited, and the insulating material used in conventional separators can be used. For example, the insulating material preferably contains insulating fine particles and a resin material. The resin material binds insulating fine particles together, and the resultant may function as a base material for forming the porous structure of the insulating layer.

The material constituting the insulating fine particles is not particularly limited as long as it can ensure electrical insulation, and either organic compounds or inorganic compounds may be used. Specific examples include organic compounds such as a poly(methyl methacrylate), a styrene-acrylic acid copolymer, an acrylonitrile resin, a polyamide resin, a polyimide resin, a poly(2-acrylamido-2-methylpropanesulfonic acid lithium salt), a polyacetal resin, an epoxy resin, a polyester resin, a phenolic resin, and a melamine resin; and inorganic compounds such as silicon dioxide, silicon nitride, alumina, titania, zirconia, boron nitride, zinc oxide, tin dioxide, niobium dioxide ($Nb_2O_5$), tantalum oxide ($Ta_2O_5$), potassium fluoride, lithium fluoride, clay, zeolite, and calcium carbonate. Further examples include known composite oxides such as a niobium-tantalum composite oxide, and a magnesium-tantalum composite oxide. With respect to the insulating fine particles, a single type thereof may be used individually or two or more types thereof may be used in combination.

When the material constituting the insulating fine particles contains an inorganic compound, it is preferable to use an inorganic compound into which lithium ions are unlikely to be inserted when the electrode of the present invention is incorporated in a battery. In other words, it is preferable to use an inorganic compound which does not prevent lithium ions from permeating through the insulating layer.

When an organic compound is included in the material constituting the insulating fine particles, the melting point or softening temperature of the organic compound is preferably 150° C. or higher, more preferably 180° C. or higher, still more preferably 200° C. or higher. By the use of an organic compound having such a melting point or a softening temperature as described above, it becomes possible to suppress a short circuit between the electrodes when the electrode of the present invention is incorporated in a battery and the excessive heat generation occurs in the battery.

When the electrode of the present invention is incorporated in a battery, it is preferable to provide a resin porous separator between the insulating layer provided on one of the electrodes and the other electrode without an insulating layer.

The resin porous separator has a function of terminating the battery reaction by closing the pores with melted resin porous separator when the excessive heat generation occurs in the battery. Therefore, when the material constituting the insulating fine particles includes an inorganic compound, it is preferable to provide the resin porous separator.

When the material constituting the insulating fine particles includes an organic compound, the melting point or softening temperature of the organic compound is preferably higher than the melting point of the resin porous separator. This enables the resin porous separator to perform the function of terminating the battery reaction by closing the pores with melted resin porous separator while preventing the short circuit when the excessive heat generation occurs in the battery. It is more preferred that the melting point or softening temperature of the organic compound is higher than the melting point of the resin porous separator by at least 20° C., still preferably by at least 40° C.

The average particle diameter of the insulating fine particles is not particularly limited as long as it is smaller than the thickness of the insulating layer to be formed, and for example, the average particle diameter is preferably in the range of 1 nm to 700 nm. The average particle diameter of the insulating fine particles can be determined based on the equivalent spherical diameters measured by the wet method with a laser diffraction particle size distribution measuring apparatus. When the average particle diameter is within the above range, the uniformity of the porous structure and the insulation of the insulating layer can be favorably maintained, and a desired air permeability is likely to be achieved as well.

For preventing the insulating layer from becoming thin upon, for example, pressurization of the laminate or the like, the insulating fine particles preferably contain 5% by volume or more of insulating fine particles having a specific average particle diameter that corresponds to 80% to 100% of the thickness of the insulating layer, based on the total volume of the insulating fine particles. The amount of the aforementioned insulating fine particles having a specific average particle diameter is more preferably 10% by volume or more, and still more preferably 20% by volume or more.

The amount of the insulating fine particles contained in the composition is preferably adjusted such that the amount of the insulating fine particles contained in the insulating layer to be formed falls preferably in the range of 15 to 95% by mass, more preferably 40 to 90% by mass, and still more preferably 60 to 85% by mass, relative to the total mass of the insulating layer. The amount is within the above range makes it easy to form an insulating layer which not only has a uniform porous structure and insulating property, but also has a desired air permeability.

From the viewpoint of enhancing the affinity with the electrolyte and the electrolytic solution in contact with the insulating layer, it is preferable to use a fine particles composed of an organic compound as the insulating fine particles. The insulating fine particles preferably contains the fine particles composed of an organic compound in an amount of 5% by mass or more, relative to the total mass of the insulating fine particles. The use of the fine particles within the above preferable amount further improves the permeability of the ions constituting the electrolyte or the electrolytic solution.

The use of both the fine particles composed of an organic compound and the fine particles composed of an inorganic compound as the insulating fine particles is advantageous for achieving excellent balance between affinity with the electrolyte and the electrolytic solution and strength of the insulating layer. The amount of the fine particles composed of an organic compound is preferably 5 to 50% by mass, and more preferably 8 to 40% by mass, relative to the total mass of the insulating fine particles contained in the insulating layer.

The insulating fine particles may have its surface treated by known surface treatment for imparting lipophilicity or hydrophilicity to the surface, for example, surface treatment with a silane coupling agent having a desired functional group. Such a surface treatment may facilitate the formation of gaps between the base material made of the above resin material and the insulating fine particles.

The type of the resin material (i.e., the aforementioned base material) constituting the porous structure of the insulating layer is not particularly limited, and a synthetic resin constituting the conventional separator can be used. Examples thereof include thermoplastic resins such as polyolefin resins, fluororesins, polyacrylonitrile resins, polystyrene resins, polyvinyl acetal resins, polyimide resins, polyester resins, acrylic resins, polyether sulfone resins, polysulfone resins, polyamide resins, polyamide-imide resins, and polyphenyl sulfone resin; and thermosetting resins such as epoxy resins, and phenolic resins. Further examples include water-soluble polymers such as polyvinyl alcohol resins, polyvinyl acetal resins, and carboxymethyl cellulose. With respect to the aforementioned synthetic resins, a single type thereof may be used individually or two or more types thereof may be used in combination.

One example of a specific method for forming the insulating layer is explained below. First, the aforementioned composition including the resin material for forming the porous structure, the insulating fine particles, a solvent (good solvent) which substantially dissolves the resin material, and a solvent (poor solvent) which does not substantially dissolve the resin material is coated on the electrode active material layer, and then, the resultant coating is dried, to thereby obtain a porous insulating layer.

The good solvent is not particularly limited, and examples thereof include water and organic solvents. Any solvent can be suitably used as long as the solvent can dissolve the resin material. Specific examples of the organic solvents as suitable solvents include alcohols such as methanol, ethanol, 1-propanol, 2-propanol, and terpineol; amide solvents such as 1-methyl-2-pyrrolidone, N,N-dimethylacetamide, and N,N-dimethylformamide; ketone solvents such as 2-butanone, and cyclohexanone; aromatic solvents such as toluene, and xylene.

The poor solvent is not particularly limited, and an appropriate solvent can be selected by confirming, in advance, the solubility of the resin material to be used. The pore size, air permeability and the like of the separator can be adjusted depending on type, characteristics, physical properties and addition amount of the poor solvent. For example, when a poor solvent having a boiling point higher than the good solvent is used, the air permeability of the separator is likely to increase. Further, the air permeability of the separator is likely to increase also in the case where the proportion of the poor solvent is increased. Specifically, the boiling point of the poor solvent is preferably 10 to 20° C. higher than that of the good solvent. The amount of the poor solvent is preferably 10 to 30% by mass, relative to the total mass of all solvents contained in the composition.

Examples of suitable poor solvent to be used in combination with the preferable good solvent mentioned above include glycols such as ethylene glycol, diethylene glycol, and glycerin; alcohols such as octanol, and decanol; aliphatic hydrocarbons such as nonane, and decane; and esters such as dibutyl phthalate.

The order of mixing the resin material, the insulating fine particles and the solvent is not particularly limited. For example, a mixture of these materials can be easily prepared by dissolving the resin material in the good solvent, followed by addition of and mixing with the insulating fine particles, and further addition of the poor solvent. Here, the method for mixing the materials is not particularly limited, and for example, the mixing can be performed by a method the materials are mixed at a temperature sufficiently lower than the boiling points of the solvents, for example, at around room temperature, for about 10 minutes to 24 hours with a known mixer such as a bead mill and a Henschel mixer.

When the resin material used is a polyvinyl butyral resin obtained by acetalizing polyvinyl alcohol, it is preferable to use the resin by dissolving or dispersing the resin in an alcohol after swelling the resin with toluene. Here, it is difficult to simply classify toluene and alcohol into a good solvent and a poor solvent; nevertheless, a porous insulating layer can be obtained by applying and drying a slurry obtained by mixing the insulating fine particles and the resin solution by the method described above.

The method for drying the composition (coating film) coated on the electrode active material layer is not particularly limited, and for example, the drying can be performed by a method in which the coated composition is placed under an atmosphere with a temperature ranging from room temperature to a temperature close to the boiling points of the solvents, and allowed to dry naturally or air-dried under reduced or normal pressure. By evaporating the solvent, the porous insulating layer can be obtained.

The insulating layer has a porous structure, and the insulating fine particles are disposed in the pores (voids) of the porous structure, which communicate with each other. If the insulating fine particles are completely adhered to the base material, the insulating fine particles simply serve as a filler embedded in the base material, resulting in the insulating layer becoming a dense body which does not substantially function as intended. However, the insulating layer constituting the electrode of the present invention has at least partially a portion where each of the insulating fine particles are not adhered to the base material; therefore, gaps are present between the base material and the insulating fine particles so as to form a porous structure where the gaps communicate with each other. The mechanism underlying the formation of the porous structure where the gaps communicate with each other at the time of production of the insulating layer is speculated as follows. A solvent is localized at the interface between the insulating fine particles and the resin which are dispersed in the resin solution constituting the composition, while the resin (base material) is prevented from completely adhering to around the insulating fine particles, whereby gaps are formed around the insulating fine particles or within the resin while the solvent is being evaporated (volatilized). These gaps are formed between the insulating particles.

From the viewpoint of the aforementioned mechanism, the amount of the insulating fine particles in the composition for obtaining the desired porous structure is preferably such that individual insulating fine particles are uniformly dispersed in the composition while being positioned relatively close to each other. Specifically, the amount of the insulating fine particles in the composition is preferably 0.3 to 20 parts by volume, more preferably from 0.7 to 15 parts by volume, and still more preferably 1.0 to 10 parts by volume, relative to 100 parts by volume of the solvents in the composition. In this case, the amount of the resin material in the composition is preferably 50 to 1,500 parts by volume, more preferably 100 to 1,000 parts by volume, and still more preferably 200 to 800 parts by volume, relative to 100 parts by volume of the insulating fine particles.

With respect to the resin material in the composition, it is preferable that the whole of the resin material is dissolved in the solvents or a part of the resin material remains undissolved and is dispersed as particles. The particle size of particles of the resin material, if any, is preferably about $1/10$ to 10 times that of the insulating fine particles. When the particle size is within this range, uniform dispersion of the composition can be easily maintained even when the composition is stored for a long time.

Further, instead of forming the insulating layer by coating the composition including the insulating material directly on the electrode active material layer, a separately prepared insulating layer may be placed on the electrode active material layer, to thereby laminate the insulating layer on the electrode active material layer.

As a method of separately forming the insulating film, for example, the insulating film can be formed on the base such as a release sheet with the above composition by the same method as mentioned above in relation to the formation of the insulating layer. Thus formed insulating film is peeled off from the base such as a release sheet, and can be laminated, as the insulating layer, on the electrode active material layer. Alternatively, the base and the insulating film may be laminated together such that the insulating film is positioned on the side of the electrode active material layer, followed by peeling off the base. During the lamination, the surface may be pressed with a smooth-surfaced flat plate or roll.

<Formation of Electrode Active Material Layer>

The method and materials for forming the electrode active material layer by coating the composition are not particularly limited, and any methods and materials can be used which are used for forming an electrode active material layer that constitutes the positive electrode or the negative electrode of a conventional secondary battery. For example, the electrode active material layer can be formed by applying a slurry containing a positive electrode active material or negative electrode active material described below to an aluminum foil or copper foil as a current collector, followed by drying.

The base on which the electrode active material layer is formed is not particularly limited, and may be the aforementioned current collector, or may be a base not for use as an electrode material, such as a release sheet. Forming the electrode active material layer on the current collector makes the electrode manufacturing process efficient. Further, when the electrode active material layer is formed on a release sheet, the release sheet may be removed after forming the electrode active material layer and the insulating layer on the release sheet, and the resultant laminate of these layers can be placed on a desired current collector.

The surface of the obtained electrode active material layer after drying is preferably further subjected to a smoothing treatment so as to adjust the surface roughness Rz value to 35 µm or less or to fall within the aforementioned preferable range.

The smoothing treatment is preferably performed by a method that can uniformly smooth the surface of the electrode active material layer. For example, the smoothing treatment can be performed by a method in which the surface is pressurized with a metal roll or flat plate. Further, increasing the uniformity of the particle size of the particulate materials constituting the electrode active material layer or reducing the particle size may contribute to the reduction of the surface roughness Rz value.

In the present invention, the surface roughness Rz value of the electrode active material layer is a ten point average roughness as measured in accordance with JIS B0601 1994. The surface roughness Rz value in accordance with this JIS standard can be measured by, for example, a non-contact 3D surface profile measuring apparatus ("WYKO NT1100", manufactured by Veeco Co.). Alternatively, the surface roughness Rz value may be determined by observing a cross section of the electrode, for example, with an electron microscope, and calculating the surface roughness Rz value by fitting a circle corresponding to the stylus radius so as to contact the pits and bumps of the active material. Also in this case, the Rz value is a mean value of the surface roughness values measured by observation with respect to randomly selected ten points as in the case of the method in accordance with the JIS standard.

<<Insulating Layer>>

The electrode in the second aspect of the present invention is preferably an electrode manufactured by the method of the first aspect. The electrode of the present invention in its first embodiment is an electrode having a laminated body including an insulating layer laminated on an electrode active material layer.

The insulating layer is functionable as a separator for insulating a positive electrode against a negative electrode in an electrochemical device such as a secondary battery, and a capacitor. The electrode active material layer is preferably formed on a current collector. The electrode active material may be either a positive electrode active material or a negative electrode active material.

The insulating layer has a porous structure. For example, lithium ions contained in the electrolyte in contact with the insulating layer is capable of diffusing into and permeating through the insulating layer. The insulating layer preferably has a porous base material containing insulating fine particles. Gaps are formed between the insulating particles and the base material, whereby the base material can form a porous structure.

With respect to the insulating layer and the electrode active material layer which constitute the electrode, a ratio (t/Rz) of a thickness value t (unit: μm) of the insulating layer to a surface roughness Rz value of the electrode active material layer is preferably at least 2.

The electrode having the above features can be said to have an insulating layer with reliable structural strength. For example, even when the insulating layer is compressed or expanded in response to change in pressure or temperature caused by external or internal factor, it is possible to prevent the bumps in the surface reflected by the surface roughness Rz value of the electrode active material layer from damaging the insulating layer. Further, even when pressurization is performed during the formation of an electrode laminate composed of a positive electrode, an electrolyte and a negative electrode in the manufacture of a battery, or during the initial charge, the surface roughness Rz value is small relative to the thickness t value of the insulating layer and the thickness t value and density of the insulating layer are substantially uniform, which reduce the risk of local occurrence of thin section in the insulating layer or defects in the disposition of the insulating fine particles constituting the insulating layer.

For measuring the surface roughness Rz value of the electrode active material constituting the electrode, it is preferable to perform the measurement with respect to the surface of the electrode active material layer, which is exposed by removing the insulating layer laminated thereon. The removal of the laminated insulating layer is performed by a method that does not substantially alter the roughness of the surface of the electrode active material layer. Specific examples of the method for removal include a method of physically or chemically removing the insulating layer, and a method of dissolving away the insulating layer with a solvent. When removal of the insulating layer from the electrode active material is difficult, the surface roughness may be calculated based on a photomicrograph of any cross-section of the electrode in its thickness direction taken through an electron microscope.

The surface roughness Rz value of the electrode active material layer having formed thereon the insulating layer is preferably 35 μm or less, more preferably 17 μm or less, and still more preferably 6 μm or less.

The surface roughness Rz value within the above range can further enhance the reliability of the structural strength.

The air permeability of the insulating layer is preferably such that lithium ions contained in the electrolyte in contact with the insulating layer is capable of diffusing into and permeating through the insulating layer. Specifically, for example, the air permeability is preferably about 1 to 600 sec/100 ml, more preferably 50 to 550 sec/100 ml, and still more preferably 100 to 500 sec/100 ml. With the air permeability of 1 sec/100 ml or more, ion transfer between the positive and negative electrodes occurs readily so as to realize a smooth electrochemical reaction. With the air permeability of 600 seconds/100 ml or less, a micro short circuit can be sufficiently prevented.

The air permeability can be determined by the Gurley tester method in accordance with JIS P 8117.

The air permeability of the insulating layer constituting the electrode is preferably measured with respect to the insulating layer from which the electrode active material layer as the base of the insulating layer has been removed. The electrode active material layer is removed by a method that does not substantially alter the air permeability of the insulating layer. Specific examples of the method for removal include a method of physically or chemically removing the electrode active material layer, and a method of dissolving away the electrode active material layer with a solvent.

The thickness t of the insulating layer constituting the electrode is not particularly limited, but is preferably 2 μm to 35 μm, more preferably 3 μm to 28 μm, still more preferably 4 μm to 17 μm, and most preferably 4 μm to 14 μm, with the proviso that the aforementioned ratio (t/Rz) is satisfied.

When the insulating layer has a thickness of 2 μm or more, insulation can be sufficiently secured. Further, even when the lithium dendrites are generated, the insulating layer can prevent the dendrites from penetrating therethrough. When the insulating layer has a thickness of 35 μm or less, it becomes possible to reduce the electrical resistance attributable to the insulating layer, that is, internal resistance of the battery. Further, the thickness within the aforementioned range can provide the insulating layer with sufficient ionic conductivity and air permeability.

The thickness t of the insulating layer constituting the electrode can be determined from a SEM photomicrograph obtained in an observation of the cross section of the electrode in its thickness direction through a scanning electron microscope. Specifically, in the SEM photomicrograph of the cross section, a boundary line is drawn by image processing or the like between the insulating layer and the electrode active material layer, and a distance between the boundary line and the surface of the insulating layer opposite to the boundary line is measured as a thickness of the insulating layer. First, in a single cross section of the electrode at any point thereof to be measured, the thickness is measured at ten points along the plan direction of the insulating layer at an interval of, for example, 1 cm, and an arithmetic mean value of the obtained ten thickness value is determined as a primary average thickness. Further, in each of cross sections of the same electrode at other two randomly selected points thereof, a primary average thickness is likewise determined. The value of the arithmetic mean of the resulting three primary average thickness values is obtained as the thickness t (μm) of the insulating layer of the electrode as the subject of the measurement.

<<Electrochemical Device>>

The electrode in the second aspect of the present invention can be used as an electrode for various electrochemical devices. Examples of preferred electrochemical devices include a primary battery, a secondary battery which can be charged and discharged, and an electric double-layer capacitor.

Hereinbelow, the configuration of a lithium ion secondary battery is illustrated taking as an example an electrochemical device including the electrode in the second aspect of the present invention as at least one of the positive and negative electrodes.

<Negative Electrode>

When using the electrode in the second aspect of the present invention as a negative electrode of a lithium ion secondary battery, such a negative electrode can be manufactured using the materials described below by the aforementioned electrode manufacturing method in the first aspect of the present invention.

The negative electrode active material layer disposed on the negative electrode current collector can be formed by applying a negative electrode material containing a negative electrode active material, a binder resin, a conductive additive and a solvent to a negative electrode current collector, followed by drying. Thereafter, it is preferable to form an insulating layer on the negative electrode active material layer by the method described above.

Examples of the negative electrode active material include lithium and carbon materials such as graphite, graphene, hard carbon and acetylene black.

Examples of the conductive additive include carbon materials such as graphite, graphene, hard carbon, ketjen black, acetylene black and carbon nanotubes.

Examples of the binder resin include polyacrylic acid, lithium polyacrylate, polyvinylidene fluoride, polyvinylidene fluoride-hexafluoropropylene copolymer, styrene-butadiene rubber, polyvinyl alcohol, polyvinyl acetal, polyethylene oxide, polyethylene glycol, carboxymethyl cellulose, polyacrylonitrile, and polyimide.

As the solvent, it is preferable to use a non-aqueous solvent, the examples of which include alcohols such as methanol, ethanol, 1-propanol, 2-propanol, and terpineol; cyclic amides such as N-methylpyrrolidone, and N,N-dimethylformamide; ketones such as acetone; and aromatic compounds such as toluene, and xylene.

Examples of the material constituting the current collector include conductive metals such as copper, aluminum, titanium, nickel, and a stainless steel.

With respect to each of the negative active material, the conductive additive, the binder resin and the solvent, a single type thereof may be used individually or two or more types thereof may be used in combination.

<Positive Electrode>

When using the electrode in the second aspect of the present invention as a positive electrode of a lithium ion secondary battery, such a positive electrode can be manufactured using the materials described below by the aforementioned electrode manufacturing method in the first aspect of the present invention.

The positive electrode active material layer disposed on the positive electrode current collector can be formed by applying a positive electrode material containing a positive electrode active material, a binder resin, a conductive additive and a solvent to a positive electrode current collector, followed by drying. Thereafter, it is preferable to form an insulating layer on the positive electrode active material layer by the method described above.

Examples of the positive active material include a lithium metalate compound represented by the general formula $LiM_xO_y$ (wherein M represents a metal, x and y respectively represent ratios of metal M and oxygen O). Specific examples include lithium cobaltite ($LiCoO_2$), lithium nickelate ($LiNiO_2$), lithium manganate ($LiMn_2O_4$), olivine-type lithium iron phosphate ($LiFePO_4$), sulfur, and a sulfur-carbon composite.

The lithium metalate compound may contain a plurality of different metal species M. Such a lithium metalate compound is exemplified by a compound represented by the general formula $LiM^1_pM^2_qM^3_rO_y$ (wherein $M^1$, $M^2$ and $M^3$ respectively represent different metals; and p, q, r and y respectively represent ratios of metals $M^1$, $M^2$ and $M^3$, and oxygen O). Here, p+q+r=x. Specific examples include $LiNi_{0.33}Mn_{0.33}Co_{0.33}O_2$.

As the binder resin, the conductive additive, the solvent and the current collector which constitute the positive electrode, the same as exemplified above for the negative electrode can be exemplified. With respect to the positive active material, the conductive additive, the binder resin and the solvent, a single type thereof may be used individually or two or more types thereof may be used in combination.

<Electrolyte>

The electrolyte is not particularly limited, and for example, known electrolytes and electrolytic solutions used in known lithium ion secondary batteries can be used. Examples of the electrolytic solution include a mixed solution using an electrolyte in a solid form or an electrolyte salt dissolved in an organic solvent. The organic solvent is preferably one having a resistance to high voltage, the examples of which include polar solvents such as ethylene carbonate, propylene carbonate, dimethyl carbonate, γ-butyrolactone, sulfolane, dimethyl sulfoxide, acetonitrile, dimethylformamide, dimethylacetamide, 1,2-dimethoxyethane, 1,2-diethoxyethane, tetrahydrofuran, 2-methyltetrahydrofuran, dioxolane, and methyl acetate; and a mixture of two or more of these polar solvents. In the case of a lithium ion secondary battery, examples of the electrolyte salts include lithium-containing salts such as $LiClO_4$, $LiPF_6$, $LiBF_4$, $LiAsF_6$, $LiCF_6$, $LiCF_3CO_2$, $LiPF_6SO_3$, $LiN(SO_3CF_3)_2$, $Li(SO_2CF_2CF_3)_2$, $LiN(COCF_3)_2$, $LiN(COCF_2CF_3)_2$, and lithium bis(oxalate)borate ($LiB(C_2O_4)$). Further examples include complexes such as organic acid lithium salt-boron trifluoride complex and complex hydrides such as $LiBH_4$. These salts or complexes can be used in the form of a mixture of two or more thereof.

When the electrolyte contains a solvent, the electrolyte may be a gel electrolyte which further contains a polymeric compound. Examples of the polymeric compound include fluoropolymers such as polyvinylidene fluoride and polyacrylic polymers such as poly(meth)acrylate.

The method of assembling a lithium ion secondary battery is not particularly limited. For example, the assembly can be performed by: obtaining an electrode laminate which has, as one or each of the positive and negative electrodes, the electrode in the second aspect of the present invention, and has the insulating layer disposed between the positive and negative electrodes; sealing the electrode laminate into an exterior body (housing) such as an aluminum laminate bag; and injecting an electrolytic solution thereinto as necessary, thereby obtaining a lithium ion secondary battery in which the insulating layer constituting the electrode has been impregnated with the electrolyte.

EXAMPLES

Hereinbelow, the present invention will be described in more detail with reference to the Examples which, however, should not be construed as limiting the present invention. The following operations were performed in a dry room as necessary.

<Formation of Negative Electrode Active Material Layer>

80 parts by mass of graphite, 15 parts by mass of hard carbon, and 5 parts by mass of polyvinylidene fluoride were mixed together, and the resulting mixture was dispersed in N-methylpyrrolidone, to thereby prepare an anode material slurry.

The thus prepared negative electrode material slurry was coated on both surfaces of a copper foil (thickness 15 μm) to form coatings of a predetermined thickness, which were then dried under reduced pressure at 100° C., −0.1 MPa for about 10 hours, and the resulting was subject to a roll press. Thus, a negative electrode substrate having negative electrode active material layers formed on both surfaces of the copper foil was obtained.

The surface roughness Rz value of the negative electrode active material layer in each of the Examples and Comparative Examples was adjusted to fall within the range of 0.8 μm to 40.7 μm by appropriately adjusting the pressurizing condition of the roll press, and by selecting the materials as described below.

In the Examples where the surface roughness Rz value of the negative electrode active material layer is in the range of 0.8 μm to 11.4 μm, a copper foil having a surface roughness Rz value of 3 μm, a graphite having an average particle diameter of 1 μm and a hard carbon having an average particle diameter of 2.4 μm were used.

In the Examples where the surface roughness Rz value of the negative electrode active material layer is in the range of 16.2 μm to 28.1 μm, a copper foil having a surface roughness Rz value of 6 μm, a graphite having an average particle diameter of 1.5 μm and a hard carbon having an average particle diameter of 4 μm were used.

In the Examples where the surface roughness Rz value of the negative electrode active material layer is in the range of 35.4 μm to 40.7 μm, a copper foil having a surface roughness Rz value of 10 μm, a graphite having an average particle diameter of 3 μm and a hard carbon having an average particle diameter of 8 μm were used.

<Formation of Insulating Layer>

A mixed solvent was prepared, which contained 1 part by mass of ethylene glycol, 20 parts by mass of ethanol, 20 parts of 2-propanol and 50 parts by mass of toluene. To this mixed solvent, 20 parts by mass of a polyvinyl butyral resin obtained by acetalizing a polyvinyl alcohol (average polymerization degree: 1700, saponification degree: 98 mol %) with n-butyraldehyde (butyralization degree: 38 mol %) and 5 parts by mass of a styrene-butadiene copolymer (SBR) were added, followed by further addition of 100 ml of ceramic balls having a diameter of 2 mm. The resulting was stirred with a ball mill (BM-10, manufactured by Seiwa Giken Kogyo) at a rotational speed of 100 rpm for 1 hour.

Thereafter, 75 parts by mass of alumina particles (TM-5D, manufactured by Taimei Chemicals Co. Ltd.; average particle diameter: 0.2 μm) were further added, followed by stirring with the aforementioned ball mill at a rotational speed 300 rpm for 2 hours, to thereby prepare a dispersion of inorganic particles (hereinafter, referred to as "inorganic dispersion").

0.8 parts by mass of the obtained inorganic dispersion, 5 parts by mass of ethanol, and 5 parts by mass of 2-propanol were mixed and stirred for dispersing treatment with an ultrasonic homogenizer for 10 minutes. The resulting was further stirred with the aforementioned ball mill at 500 rpm for 15 minutes, to thereby prepare a slurry composition. Before using the prepared slurry composition, the ceramic balls (diameter: 2 mm) were removed from the slurry composition. The above operations were carried out at 25° C.

Examples 1 to 30, Comparative Examples 1 to 14

<Production of Negative Electrode>

In each of the Examples and Comparative Examples, a negative electrode having laminated thereon an insulating layer with a thickness t was manufactured by using the negative electrode substrate obtained above, and by applying the above slurry composition with an appropriate thickness on the negative electrode active material layer having a surface roughness Rz value as described in Tables below, followed by drying.

The produced negative electrode was cut such that the resulting negative electrode has a section (104×62 mm) laminated with the negative electrode active material layer, and a section (tab section, about 2×2 cm) not laminated with the negative electrode active material layer.

The ratio (t/Rz) of each negative electrode and the capacity retention (%) indicating the cycle performance of the lithium ion secondary battery using each negative electrode are shown in Table 1 and Table 2.

TABLE 1

|  | Rz of active material layer | Thickness t of insulating layer | Capacity retention (%) | t/Rz | Evaluation |
|---|---|---|---|---|---|
| Ex. 1 | 0.8 | 5.2 | 83 | 6.5 | ⊚ |
| Ex. 2 | 1.1 | 5.3 | 83 | 4.8 | ⊚ |
| Ex. 3 | 1.5 | 5.2 | 82 | 3.5 | ○ |
| Ex. 4 | 2.2 | 5.2 | 80 | 2.4 | ○ |
| Comp. Ex. 1 | 2.9 | 5.2 | 68 | 1.8 | X |
| Comp. Ex. 2 | 3.3 | 5.2 | 52 | 1.6 | X |
| Ex. 5 | 0.8 | 10.1 | 86 | 12.6 | ☆ |
| Ex. 6 | 1.1 | 10.2 | 85 | 9.3 | ☆ |
| Ex. 7 | 1.5 | 10.2 | 84 | 6.8 | ⊚ |
| Ex. 8 | 2.2 | 10.3 | 83 | 4.7 | ⊚ |
| Ex. 9 | 2.8 | 10.3 | 81 | 3.7 | ○ |
| Ex. 10 | 4.5 | 10.2 | 81 | 2.3 | ○ |
| Comp. Ex. 3 | 5.3 | 10.2 | 74 | 1.9 | X |
| Comp. Ex. 4 | 5.3 | 10.2 | 77 | 1.9 | X |
| Ex. 11 | 1.5 | 15.8 | 85 | 10.5 | ☆ |

TABLE 1-continued

|  | Rz of active material layer | Thickness t of insulating layer | Capacity retention (%) | t/Rz | Evaluation |
|---|---|---|---|---|---|
| Ex. 12 | 2.2 | 15.8 | 85 | 7.2 | ☆ |
| Ex. 13 | 5.3 | 15.9 | 82 | 3.0 | ○ |
| Comp. Ex. 5 | 8.2 | 15.9 | 72 | 1.9 | X |
| Comp. Ex. 6 | 11.4 | 15.9 | 58 | 1.4 | X |

TABLE 2

|  | Rz of active material layer | Thickness t of insulating layer | Capacity retention (%) | t/Rz | Evaluation |
|---|---|---|---|---|---|
| Ex. 14 | 1.5 | 20.8 | 86 | 13.9 | ☆ |
| Ex. 15 | 2.5 | 20.8 | 85 | 8.3 | ☆ |
| Ex. 16 | 4.5 | 20.9 | 83 | 4.6 | ◉ |
| Ex. 17 | 5.3 | 20.9 | 82 | 3.9 | ○ |
| Ex. 18 | 8.3 | 20.7 | 82 | 2.5 | ○ |
| Comp. Ex. 7 | 11.4 | 20.8 | 75 | 1.8 | X |
| Ex. 19 | 1.5 | 30.2 | 85 | 20.1 | ☆ |
| Ex. 20 | 2.2 | 30.2 | 86 | 13.7 | ☆ |
| Ex. 21 | 5.3 | 30.2 | 83 | 5.7 | ◉ |
| Ex. 22 | 8.3 | 30.2 | 82 | 3.6 | ○ |
| Ex. 23 | 11.4 | 30.3 | 82 | 2.7 | ○ |
| Comp. Ex. 8 | 16.2 | 30.2 | 74 | 1.9 | X |
| Ex. 24 | 11.4 | 39.9 | 85 | 3.5 | ☆ |
| Ex. 25 | 16.2 | 39.9 | 84 | 2.5 | ◉ |
| Ex. 26 | 18.2 | 40 | 82 | 2.2 | ○ |
| Comp. Ex. 9 | 24.6 | 39.2 | 80 | 1.6 | ○ |
| Comp. Ex. 10 | 28.1 | 40 | 76 | 1.4 | X |
| Ex. 27 | 16.2 | 50 | 86 | 3.1 | ☆ |
| Ex. 28 | 24.5 | 50 | 85 | 2.0 | ☆ |
| Comp. Ex. 11 | 28.1 | 50 | 83 | 1.8 | ◉ |
| Comp. Ex. 12 | 35.4 | 50 | 83 | 1.4 | ◉ |
| Ex. 29 | 24.5 | 60 | 86 | 2.4 | ☆ |
| Ex. 30 | 28.1 | 60 | 86 | 2.1 | ☆ |
| Comp. Ex. 13 | 35.7 | 60 | 83 | 1.7 | ◉ |
| Comp. Ex. 14 | 40.7 | 60 | 82 | 1.5 | ○ |

<Production of Positive Electrode>

93 parts by mass of nickel-cobalt-lithium manganate (Ni:Co:Mn=1:1:1), 3 parts by mass of polyvinylidene fluoride, and 4 parts by mass of carbon black as a conductive additive were mixed, and the resulting mixture was dispersed into N-methylpyrrolidone to prepare a positive electrode material slurry.

The thus prepared positive electrode material slurry was coated on both surfaces of an aluminum foil (thickness: 15 μm) to form coatings of a predetermined thickness, which were then dried under reduced pressure at 100° C., −0.1 MPa for 10 hours, and the resulting was subject to a roll press. Thus, a positive electrode substrate having positive electrode active material layers formed on both surfaces of the aluminum foil was obtained. The produced positive electrode substrate was cut such that the resulting positive electrode has a section (102×60 mm) laminated with the positive electrode active material layer, and a section (tab section, about 2×2 cm) not laminated with the positive electrode active material layer.

<Production of Electrolyte>

Lithium oxalate-boron trifluoride complex (LOX-BF$_3$) was dissolved into a mixture of ethylene carbonate (EC), diethyl carbonate (DEC) and γ-butyrolactone (GBL) (EC: DEC:GBL=30:60:10, mass ratio) to thereby obtain an electrolytic solution having a lithium ion concentration of 1.0 mol/kg.

<Manufacture of Lithium Ion Secondary Battery>

In the Examples and Comparative Examples, the respectively prepared negative electrodes and a commonly prepared positive electrode were used. In each of the Examples and Comparative Examples, the negative electrode and the positive electrode were superimposed with the insulating layer of the negative electrode sandwiched between, while allowing the terminal tabs of respective electrodes to protrude outward from the negative electrode and the positive electrode. Then, the tabs were joined by ultrasonic welding to obtain an electrode laminate.

In each of the Examples and Comparative Examples, an aluminum laminate film was disposed such that the terminal tabs protruding from the negative electrode and the positive electrode of the electrode laminate are allowed to protrude outside the aluminum laminate film, followed by injection of the electrolytic solution into the electrode laminate. Then, the aluminum laminate film was sealed along the outer periphery thereof so as to vacuum seal the electrode laminate, thereby producing a lithium ion secondary battery. The rated capacity of the battery produced was 200 mAh.

Example 31

<Production of Negative Electrode>

Silicon monoxide (SiO, average particle diameter: 5.0 μm, 70 parts by mass), VGCF (registered trademark) (5 parts by mass), SBR (5 parts by mass) and polyacrylic acid (10 parts by mass) were placed in a reagent bottle, followed by further addition of distilled water for adjusting the concentration. The resulting mixture was stirred with a planetary centrifugal mixer at 2000 rpm for 2 minutes. To the mixture, acetylene black (5 parts by mass), Ketjen black (5 parts by mass) were added, followed by stirring with a planetary centrifugal mixer at 2000 rpm for 2 minutes. The, the mixture was subjected to a dispersing treatment with an ultrasonic homogenizer for 10 minutes, followed by stirring again with a planetary centrifugal mixer at 2000 rpm for 3 minute, thereby obtaining a negative electrode material slurry.

The above VGCF (registered trademark) (official name: vapor grown carbon fiber) is a product of Showa Denko KK. With respect to this VGCF, the average aspect ratio (B) is 400, the average diameter (outer diameter) is 12.5 nm, and the average length is 5 μm.

The prepared negative electrode material slurry was coated with a predetermined thickness on a copper foil (thickness: 15 μm, surface roughness Rz: 3 μm), followed by drying on a hot plate having a temperature of 50° C. The resulting was pressed with a roll pressing machine while appropriately adjusting the pressurizing condition to form an anode active material layer having a thickness of 25 μm. Thus, a negative electrode precursor was obtained.

Subsequently, 50 μL/cm$^2$ of the electrolytic solution to be described later was dripped onto a surface of the negative active material layer, and a lithium foil having a thickness of 200 μm was overlaid on the surface. The resulting was allowed to stand for 48 hours so as to pre-dope lithium to the negative electrode precursor, thereby obtaining a negative electrode. The lithium foil was removed from the negative electrode after the pre-doping.

<Production of Positive Electrode>

93 parts by mass of nickel-cobalt-lithium manganate (Ni:Co:Mn=1:1:1), 3 parts by mass of polyvinylidene fluoride, and 4 parts by mass of carbon black as a conductive additive were mixed, and the resulting mixture was dispersed into N-methylpyrrolidone to prepare a positive electrode material slurry.

The prepared positive electrode material slurry was coated on an aluminum foil (thickness: 15 μm) to form a coating of a predetermined thickness, which was then dried under reduced pressure at 90° C., −0.1 MPa for 10 hours. The resulting was pressed with a roll pressing machine while appropriately adjusting the pressurizing condition, thereby obtaining a positive electrode on the aluminum foil, which has an active material layer having a thickness of 15 μm and a surface roughness Rz value of 1.5

<Formation of Insulating Layer>

100 parts by mass of dimethylformamide (DMF), 15 parts by mass of polyvinylidene fluoride resin and 100 ml of ceramic balls having a diameter of 2 mm were mixed and stirred with a ball mill (BM-10, manufactured by Seiwa Giken Kogyo) at a rotational speed of 100 rpm for 1 hour.

Thereafter, 8 parts by mass of alumina particles (TM-5D, manufactured by Taimei Chemicals Co. Ltd.; average particle diameter: 0.2 μm) were further added, followed by stirring with the aforementioned ball mill at a rotational speed 300 rpm for 2 hours, to thereby prepare a dispersion of inorganic particles (hereinafter, referred to as "inorganic dispersion"). Then, the ceramic balls (diameter: 2 mm) were removed from the inorganic dispersion to obtain a slurry composition. The above operations were carried out at 25° C.

The above slurry composition was coated with an appropriate thickness on the positive electrode active material layer, followed by drying under reduced pressure at 95° C., −0.1 MPa for 10 hours, thereby obtaining a positive electrode having laminated thereon an insulating layer having a thickness of 10

The produced positive electrode was cut such that the resulting positive electrode has a section (104×62 mm) laminated with the positive electrode active material layer, and a section (tab section, about 2×2 cm) not laminated with the positive electrode active material layer.

<Production of Electrolyte>

10 parts by mass of lithium oxalate-boron trifluoride complex (LOX-BF$_3$), 10 parts by mass of ethylene carbonate (EC) and 10 parts by mass of diethyl carbonate (DEC) were mixed to dissolve the solids, thereby obtaining a composition.

Then, 30 parts by mass of ethylene carbonate (EC), 30 parts by mass of diethyl carbonate (DEC) and 10 parts by mass of polyvinylidene fluoride resin were mixed to dissolve the solids, and the resulting was added to and mixed with the composition, thereby obtaining a gel electrolyte.

<Manufacture of Lithium Ion Secondary Battery>

The terminal tabs of respective electrodes were positioned so as to protrude outward from the negative electrode and the positive electrode, and the tabs were joined by ultrasonic welding.

The gel electrolyte was coated with a thickness of 25 μm on the negative electrode, and the positive electrode was superposed on the negative electrode such that the gel electrolyte and the insulating layer of the positive electrode were in contact with each other, to thereby obtain an electrode laminate.

An aluminum laminate film was disposed such that the terminal tabs protruding from the negative electrode and the positive electrode of the electrode laminate were allowed to protrude outside the aluminum laminate film, followed by sealing the aluminum laminate film along the outer periphery thereof so as to vacuum seal the electrode laminate, thereby producing a lithium ion secondary battery. The rated capacity of the battery produced was 350 mAh.

The produced battery was evaluated in the same manner as in Example 1 etc. The results are shown in Table 3.

TABLE 3

| Rz of active material layer | Thickness t of insulating layer | Capacity retention (%) | t/Rz | Evaluation |
| --- | --- | --- | --- | --- |
| 1.5 | 10 | 83 | 6.7 | ⊚ |

With respect to the lithium ion secondary battery obtained in each of the Examples and Comparative Examples, a voltage application (constant current/constant voltage charging) was carried out at 0.01 C (applied current value/rated battery capacity) at 25° C. with the upper limit voltage of 1.5 V until the current value dropped to 0.001C. Then, a portion of the laminate film exterior body was opened to withdraw gas generated in the cell, and then vacuum sealed again for use in the evaluation of the charge/discharge performance.

<Evaluation of Charge/Discharge Performance of Lithium Ion Secondary Battery>

With respect to the lithium ion secondary battery obtained in each of the Examples and Comparative Examples, a constant current/constant voltage charging was carried out at 0.2 C (applied current value/rated battery capacity) at 25° C. with the upper limit voltage of 4.2V until the current value dropped to 0.1C, and then a constant current discharge was carried out at 0.2 C to 2.7 V. The thus obtained discharge capacity was set as an initial value (100%). Thereafter, the charge/discharge cycles were repeated at 1C to measure the discharge capacity at the 50th cycle, and the capacity retention was calculated by: [discharge capacity (mAh) at the 50th cycle]/[discharge capacity (mAh) at the 1st cycle]× 100(%). The results are shown in Tables 1 to 3.

In the Tables, the capacity retention of 85% or more is evaluated as "☆", the capacity retention of 83% or more is evaluated as "⊚", the capacity retention of 80% or more is evaluated as "○", and the capacity retention of less than 80% is evaluated as "×".

The above results show that the capacity retention evaluation "○" was obtained when the ratio t/Rz was greater than 2, the capacity retention evaluation of "⊚" was obtained when the ratio t/Rz was greater than 4, and the capacity retention evaluation "☆" was be obtained when the ratio t/Rz was greater than 8.

In all of the Comparative Examples, the ratio t/Rz values were not greater than 2, and when the thickness t of the insulating layer was not greater than 35 μm, the capacity retention evaluation was "×". Even in the Comparative Examples, there were cases where the capacity retention evaluation was high when the thickness t of the insulating layer exceeded 35 μm. However, a thick insulation layer means a high internal resistance of the battery, and hence is disadvantageous in this respect.

The elements, combinations thereof, etc. that are explained above in connection with the specific embodiments of the present invention are mere examples, and various alterations such as addition, omission and substitution of any components, etc. may be made as long as such alterations do not deviate from the gist of the present invention. The present invention should not be limited by the above explanations and is limited only by the annexed claims.

INDUSTRIAL APPLICABILITY

The present invention is applicable in the field of various electrochemical devices such as a lithium ion secondary battery.

The invention claimed is:

1. A method for manufacturing an electrode having a laminated body comprising an insulating layer laminated on an electrode active material layer, said method comprising:
    forming the electrode active material layer comprising an electrode active material; and
    laminating the insulating layer directly on the electrode active material layer formed on a base, the insulating layer comprising at least one of a polyolefin resin, a fluororesin, a polyacrylonitrile resin, a polystyrene resin, a polyvinyl acetal resin, a polyimide resin, a polyester resin, an acrylic resin, a polyether sulfone resin, a polysulfone resin, a polyamide resin, a polyamide-imide resin, a polyphenyl sulfone resin, an epoxy resin, a phenolic resin, a polyvinyl alcohol resin, a polyvinyl acetal resin, and carboxymethyl cellulose,
    such that a thickness value of the insulating layer is at least twice a surface roughness Rz value of the electrode active material layer,
    the surface roughness Rz value being a ten point average roughness as measured in accordance with JIS B0601 1994.

2. The method according to claim 1, where the laminating the insulating layer directly on the electrode active material layer formed on a base comprises:
    laminating the insulating layer by coating a composition comprising an insulating material on the electrode active material layer,
    such that coating the composition such that a thickness value of the insulating layer is at least twice a surface roughness Rz value of the electrode active material layer.

3. The method according to claim 1, wherein the surface roughness Rz value is 35 μm or less.

4. The method according to claim 2, wherein the composition is coated such that the thickness value of the insulating layer is in a range of 2 μm to 35 μm.

5. The method according to claim 2, wherein the composition is coated by blade coating method.

6. An electrode having a laminated body comprising:
    an electrode active material layer comprising an electrode active material; and
    an insulating layer laminated directly on the electrode active material layer, the insulating layer comprising at least one of a polyolefin resin, a fluororesin, a polyacrylonitrile resin, a polystyrene resin, a polyvinyl acetal resin, a polyimide resin, a polyester resin, an acrylic resin, a polyether sulfone resin, a polysulfone resin, a polyamide resin, a polyamide-imide resin, a polyphenyl sulfone resin, an epoxy resin, a phenolic resin, a polyvinyl alcohol resin, a polyvinyl acetal resin, and carboxymethyl cellulose,
    wherein:
    a ratio (t/Rz) of a thickness value of the insulating layer to a surface roughness Rz value of the electrode active material layer is at least 2, and
    the surface roughness Rz value being a ten point average roughness as measured in accordance with JIS B0601 1994.

7. The electrode according to claim 6, wherein the surface roughness Rz value is 35 μm or less.

8. The electrode according to claim 6, wherein the thickness value of the insulating layer is in a range of 2 μm to 35 μm.

9. A method for manufacturing a secondary battery having a positive electrode, a negative electrode, and an insulating layer laminated between the positive electrode and the negative electrode, said method comprising:
    forming an electrode active material layer comprising an electrode active material; and
    laminating the insulating layer directly on the electrode active material layer of one of the positive electrode and the negative electrode, the insulating layer comprising at least one of a polyolefin resin, a fluororesin, a polyacrylonitrile resin, a polystyrene resin, a polyvinyl acetal resin, a polyimide resin, a polyester resin, an acrylic resin, a polyether sulfone resin, a polysulfone resin, a polyamide resin, a polyamide-imide resin, a polyphenyl sulfone resin, an epoxy resin, a phenolic resin, a polyvinyl alcohol resin, a polyvinyl acetal resin, and carboxymethyl cellulose,
    the insulating layer having a thickness value of at least twice a surface roughness Rz value of the electrode active material layer, and
    the surface roughness Rz value being a ten point average roughness as measured in accordance with JIS B0601 1994.

10. The method according to claim 9, wherein the surface roughness Rz value of the electrode active material layer is 35 μm or less.

11. The method according to claim 9, wherein the thickness value of the insulating layer is in a range of 2 μm to 35 μm.

12. A secondary battery comprising:
    a positive electrode;
    a negative electrode facing the positive electrode; and
    an insulating layer laminated between the positive electrode and the negative electrode, wherein:
    at least one of the positive electrode and the negative electrode comprises an electrode active material layer comprising an electrode active material formed on a surface of the at least one of the positive electrode and the negative electrode,
    the insulating layer is positioned directly on the electrode active material layer,
    the insulating layer comprises at least one of a polyolefin resin, a fluororesin, a polyacrylonitrile resin, a polystyrene resin, a polyvinyl acetal resin, a polyimide resin, a polyester resin, an acrylic resin, a polyether sulfone resin, a polysulfone resin, a polyamide resin, a polyamide-imide resin, a polyphenyl sulfone resin, an epoxy resin, a phenolic resin, a polyvinyl alcohol resin, a polyvinyl acetal resin, and carboxymethyl cellulose, and
    a ratio (t/Rz) of the thickness value of the insulating layer to the surface roughness Rz value of the electrode active material layer is at least 2.

13. The secondary battery according to claim 12, wherein the surface roughness Rz value of the electrode active material layer is 35 μm or less.

14. The secondary battery according to claim 12, wherein the thickness value of the insulating layer is in a range of 2 μm to 35 μm.

15. The secondary battery according to claim 12, wherein the surface roughness Rz value of the electrode active material layer is 17.5 μm or less, and the thickness value of the insulating layer is in a range of 2 μm to 35 μm.

16. The secondary battery according to claim 12, which has a porous resin separator provided between the positive electrode and the negative electrode.

17. The method according to claim 1, wherein the thickness value of the insulating layer is at least 4 times the surface roughness Rz value of the electrode active material layer.

18. The method according to claim 1, wherein the thickness value of the insulating layer is at least 8 times the surface roughness Rz value of the electrode active material layer.

19. The electrode according to claim 6, wherein the ratio (t/Rz) is at least 4.

20. The electrode according to claim 6, wherein the ratio (t/Rz) is at least 8.

21. The method according to claim 9, wherein the insulating layer having the thickness value of at least 4 times the surface roughness Rz value of the electrode active material layer.

22. The method according to claim 9, wherein the insulating layer having the thickness value of at least 8 times the surface roughness Rz value of the electrode active material layer.

23. The secondary battery according to claim 12, wherein the ratio (t/Rz) of the thickness value to the surface roughness Rz value is at least 4.

24. The secondary battery according to claim 12, wherein the ratio (t/Rz) of the thickness value to the surface roughness Rz value is at least 8.

25. The method according to claim 9, further comprising: coating a gel electrolyte on one of the positive electrode and the negative electrode.

26. The secondary battery according to claim 12, further comprising:
a gel electrolyte between the positive electrode and the negative electrode.

27. The method according to claim 1, wherein the insulating layer comprises 5% or more by volume of insulating fine particles having a specific average particle diameter that corresponds to 80% to 100% of a thickness of the insulating layer, an amount of the insulating fine particles being in a range of 15 to 95% by mass of a mass of the insulating layer, and the insulating fine particles including 5% by mass or more of organic fine particles.

28. The method according to claim 1, wherein the thickness value of the insulating layer is at least twice a surface roughness Rz value of the electrode active material layer and not more than 30 times the surface roughness Rz.

* * * * *

UNITED STATES PATENT AND TRADEMARK OFFICE
CERTIFICATE OF CORRECTION

PATENT NO.         : 10,770,743 B2                                    Page 1 of 1
APPLICATION NO.    : 15/539368
DATED              : September 8, 2020
INVENTOR(S)        : Rie Teransishi et al.

It is certified that error appears in the above-identified patent and that said Letters Patent is hereby corrected as shown below:

On the Title Page

References Cited, Other Publications, Column 2, Line 28, please change "lodes" to – diodes – after light-emitting.

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*